United States Patent [19]

Zamparelli et al.

[11] 4,403,937

[45] Sep. 13, 1983

[54] DEVICE TO SPREAD THE DOUGH FOR PIZZA

[75] Inventors: Walter Zamparelli, Udine; Antonio Cimenti, S. Dona' di Piave; Giuseppe Muscariello, Udine, all of Italy

[73] Assignee: Zamuci Srl, Italy

[21] Appl. No.: 382,551

[22] Filed: May 27, 1982

[30] Foreign Application Priority Data

Jun. 18, 1981 [IT] Italy .............................. 83410 A/81

[51] Int. Cl.³ .......................... A21C 3/02; B29D 7/14
[52] U.S. Cl. ................................................. 425/337
[58] Field of Search ...................... 425/335, 337, 363

[56] References Cited

U.S. PATENT DOCUMENTS

| | | | | |
|---|---|---|---|---|
| 3,368,502 | 2/1968 | Elgner | .................................. | 425/337 |
| 3,792,948 | 2/1974 | Martinez | ............................ | 425/335 |
| 3,883,283 | 5/1975 | Herrera | .............................. | 425/337 |

FOREIGN PATENT DOCUMENTS 289367 3/1953 Switzerland .

Primary Examiner—Willard E. Hoag
Attorney, Agent, or Firm—Stevens, Davis, Miller & Mosher

[57] ABSTRACT

A device to spread to thin circular rounds the lumps of dough used in the preparation of pizzas, comprising: a carrying structure having a sloping working surface, a first pair of rollers to roll the dough which are anchored by supports to the sloping surface of the carrying structure, a second pair of rollers to roll the dough which are positioned substantially at an angle to said first pair and are anchored by supports to said sloping surface of the carrying structure, the gap between the rollers of the second pair being the same as the final thickness of the thin round, and an oscillator for temporarily and movably supporting and guiding the thin round being formed.

9 Claims, 2 Drawing Figures

DEVICE TO SPREAD THE DOUGH FOR PIZZA

This invention relates to a device to spread out the dough for pizza. More particularly, the invention relates to a device to spread out, in thin circular rounds of a desired thickness, the lumps of dough used in the preparation of pizzas.

The lumps of dough used to prepare pizzas are kneaded into a shape and distribution of mass like that of a sphere or hemisphere some hours before being used so as to allow the dough to rise properly and can be rolled out either at the time when the pizza is to be prepared and cooked or beforehand.

In the daily business of a pizza parlor the work of spreading out the lumps of dough may be concentrated within the short space of time while the pizzas are being eaten.

In any event, if this work is done by hand, considerable problems are met both as regards cost and also in finding the personnel required.

Mechanical devices are known which spread out the lumps of dough by pressing them between two disks.

The devices bring about only a small increase in output as compared to production by hand and have the shortcoming that the thin round of dough obtained remains partially stuck to the disks owing to the force exerted in spreading and moving the dough from the middle to the periphery of the disks.

To overcome this shortcoming it has been necessary to heat the disks strongly, but this expedient not only affects the complexity and cost of construction and the convenience of using the device to an unfavorable extent but also impairs the quality of the thin round thus obtained, said quality having already been lowered by the high pressure which the dough has to undergo.

Machines for rolling dough are disclosed in U.S. Pat. No. 3,792,948 and CH-A-No. 289,367.

These two patents each teach dough rolling apparatus emplying two pairs of rollers arranged at right angles to each other generally in two parallel horizontal planes.

In the machine decribed in CH-A-No. 289,367, the dough after being rolled by the first pair of rollers, must be fed by hand to the second pair of rollers. This drastically reduces the production rate of the machine and the handling of the dough may ruin the pizza rounds.

To obviate this disadvantage the machine disclosed in U.S. Pat. No. 3,792,948 employs, intermediate to the two pairs of rollers, a conveyor belt means moving parallel to the axis of the first pair of rollers and normal to the axis of the second pair of rollers, there being provided an inclined chute between the first pair of rollers and the conveyor means.

Although the production rate of the machine of the U.S. Pat. No. 3,792,948 is higher, the machine itself requires many moving parts and a fairly complicated transmission and coupling means which renders it unecomonic to construct and large in size for a pizza parlor.

The invention has the pre-set aims of providing a simple small machine to spread the lumps of dough for pizzas into thin circular rounds which can be readily and economically made, has a high output, is practical to use and does not impair in any way the quality of the thin rounds obtained and which can be easily installed and operated in a pizza parlor.

The device to spread the dough for pizzas comprises combination:

a carrying structure having a sloping working surface;

a first pair of rollers to roll the dough, the rollers being secured to the sloping surface of the carrying structure by supports;

a second pair of rollers to roll the dough, the rollers being disposed substantially at an angle to the first pair and being secured to the sloping surface of the carrying structure by supports;

a metal sheet which acts as a sliding surface for the dough and is installed on the sloping surface in such a way that the lower rollers of the pairs protrude partially from the surface, whereby the protrusion of the lower rollers can be regulated with suitable spacer means that anchor the surface;

an oscillating supporting and guiding means fitted to the surface in the zone between the two pairs of rollers, the means being able to temporarily and movably uphold and guide the dough sliding on the sliding surface only when the dough is engaged by the first pair of rollers.

According to a preferential embodiment of the invention the pairs of rollers are positioned at right angle to each other and at an angle to the lower side of the sliding working surface of the carrying structure. Furthermore, according to a preferential embodiment the oscillating supporting and guiding means consists of a counter-balanced lever pivoting on the sliding surface and having a curved first arm that sustains and guides the dough during its exit from the first pair of rollers and a second arm that is equipped with a counterweight and regulates the supporting and guiding action exerted by the curved first arm which allows the dough to slide towards the second pair of rollers once the dough is disengaged from the first pair of rollers.

Further according to the invention there is provided on the sliding surface at the exit of the first pair of rollers and opposite to the oscillating supporting and guiding means a rotating path-corrector means kinematically connected to at least one of the pairs of rollers acting on the internal side of the dough as it comes out of the first pair of rollers. The path-corrector means tends to prevent the rotation of the dough about an axis perpendicular to the sliding surface and ensures that the rolled dough slide towards the second pair of rollers with its major axis parallel thereto.

Other details and features of the invention will stand out from the description given below by way of nonlimitative example and with reference to the accompanying drawings, in which.

Figure 1:
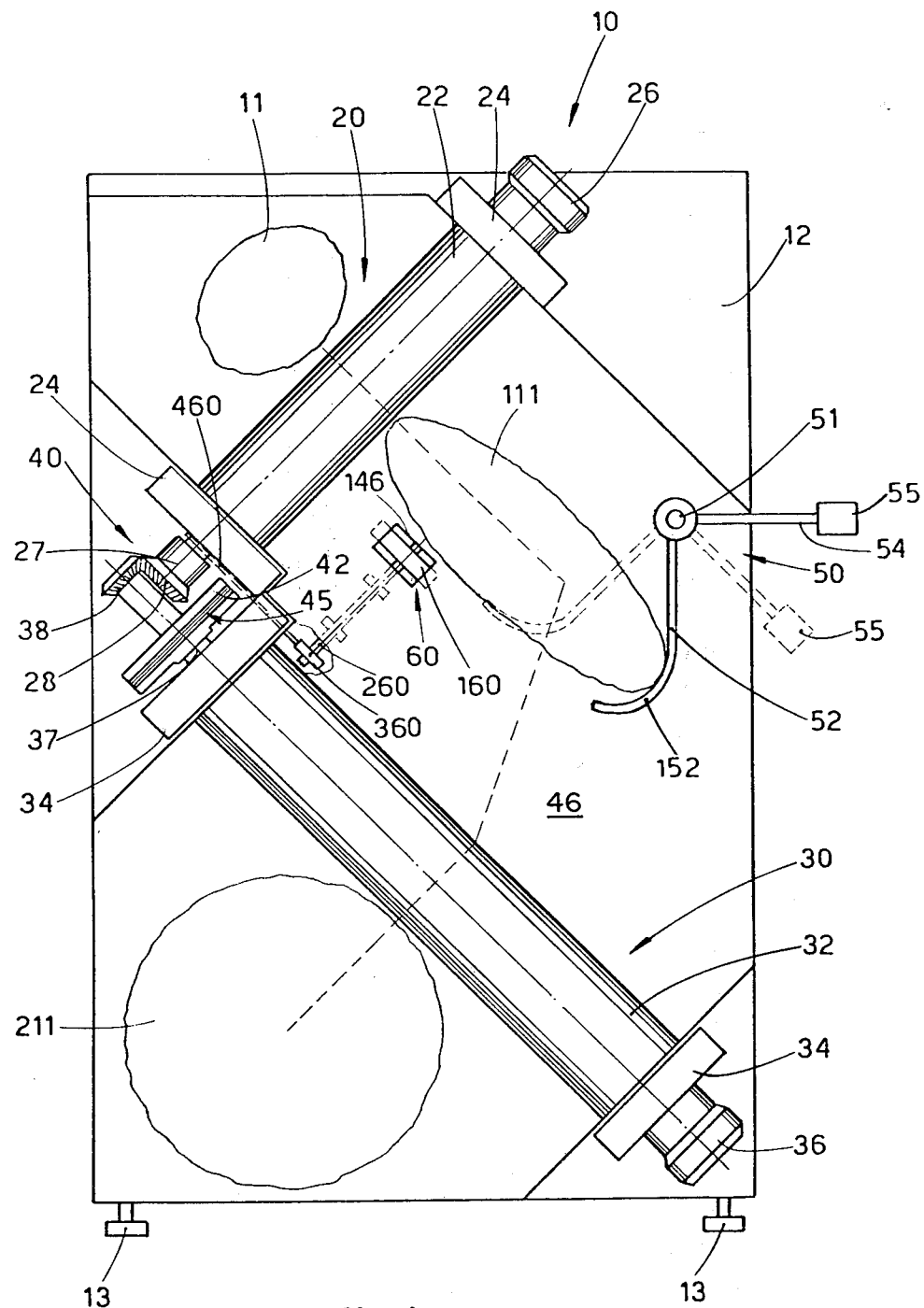
FIG. 1 shows a front view of the device of the invention and shows the shape of the dough before and after it has been rolled for the first and second times.
Figure 2:
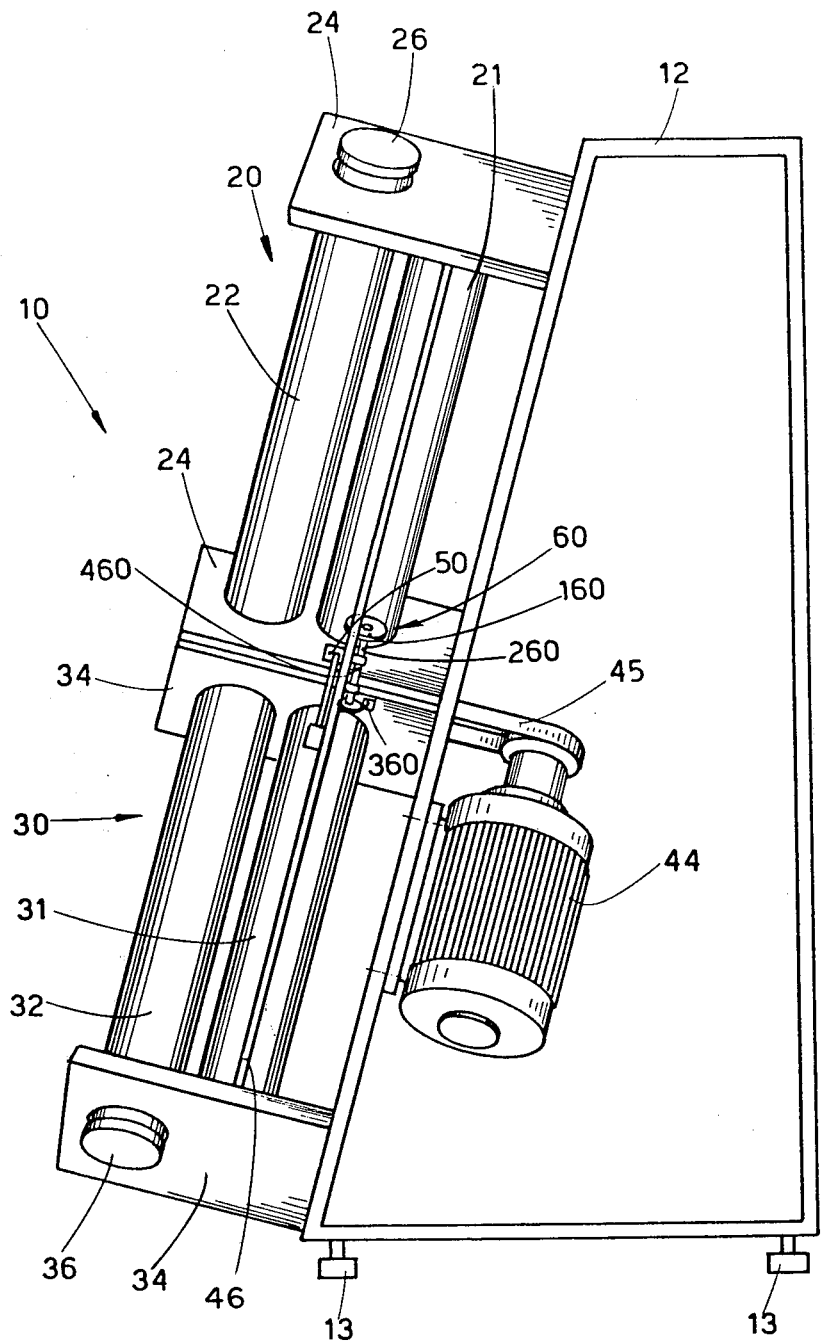
FIG. 2 shows a side view of the device of the invention.

In the figures, there is shown device 10 with adjustable feet 13 and a first pair of rollers 20. Said pair consists of the lower roller 21 and upper roller 22, which are upheld by the supports 24 and equipped with eccentric means 26 that regulates the gap between the rollers. On the roller 21, at one end 27 outside the support 24, a bevel gear 28 is installed, which is part of the bevel gear pair 40 that transmits motion to the first pair of rollers 20. A second pair of rollers 30 consists of the lower rollers 31 and upper roller 32, which are upheld by the supports 34 and equipped with eccentric means 36 that regulate the gap between the rollers.

The gap is the same as the desired thickness of the thin rounds and is about half of the gap between the rollers 21-22 of the first pair 20.

On the roller 31, at one end 37 outside the support 34, a bevel gear 38 is installed and is part of the bevel gear pair 40.

Bevel gear pair 40 transmits the motion received by the end 37 of the roller 31 to the first pair of rollers 20. On to the end 37 there is keyed a pulley 42 that is operated through suitable transmission means 45 by the motor means 44, which in this instance consists of an electric motor fitted inside the carrying structure 12.

A metal sheet 46 acts as the sliding surface for the dough and is fitted substantially, but not necessarily, parallel to the sloping surface of the carrying structure 12 at a level which coincides with the upper half of the lower rollers 21,31 and which can be adjusted with anchoring spacer means 47.

An oscillating supporting means 50 consist of a curved counter balanced lever oscillating about pivot 51 parallel to the metal sheet 46, which is able to keep the dough in the direction of the first rolling thereof by means of its curved first arm 52 as long as the dough is engaged by the first pair of rollers 20, and is coordinated in this by the action of its second arm 54 carrying a counterweight 55 to the curved arm 52.

The action of the counterweight arm 54 can also be carried out effectively by suitable positioned spring means instead of the counterweight arm 54. The dough is represented by 11, 111 and 211 which are respectively the dough 11 at the intake of the device, 111 after the first rolling and 211 at the outlet of the device after the second rolling.

The lever arm 52 has a terminal portion 152 which is curved towards the first pair of rollers in such a way that when the arm 52 is in the lowest position i.e. when the upper end of the dough leaves the first pair of rollers 20 the curved portion 152 points in a direction perpendicular to the second pair of rollers.

This allows the dough to freely slide under its own weight towards the second pair of rollers 30 with its major axis parallel thereto after leaving the first pair of rollers 20.

To eliminate any tendency of the dough leaving the first pair of rollers 20 to freely rotate and slide towards the second pair of rollers 30 before being completely disengaged by the first pair of rollers 20, a path-corrector means 60 may be provided in the corner formed between the two pairs of rollers 20 and 30 and inwardly in relation to the oscillating supporting means 50. The path-corrector means consists of a rotatable disc 160 whose periphery engages the dough on the internal side of its major axis so as to the dough towards the oscillating supporting means.

The rotating disc 160 protrudes through a slit 146 cut through metal sheet 46 and is rotatingly mounted on the inside of said of metal sheet 46 on a shaft 260 on which a wheel 360 fixed which wheel is kinematically connected to the first pair of rollers 20 by a belt 460 so as to rotate in synchronization therewith (see the partially cut away part of sheet metal 46 in FIG. 1).

It is obvious that the second rolling carried out by the second pair of rollers 30 will spread out the thin round and make it take up the circular shape 211 and the desired thickness determined by the gap between the rollers of the second pair of rollers 30.

A preferential embodiment of the invention has been described; but many variants are possible. Thus the shapes, sizes and proportions of the parts can be changed, and different means to transmit and couple the motion to the roller. It is possible to fit two or more pairs of rollers on a surface which can be upright, or sloped otherwise, and the pairs of rollers can be positioned at other angles to each other by replacing the oscillating supporting and guiding means with a plurality of suitable means to rotate the thin rounds between one pair of rollers and the next pair of rollers.

Thus it is also possible that one or both of the pairs of rollers 20-30 or else that one or both of the rollers of a roller group are specially shaped axially or perhaps circumferentially.

These and other variants are possible for a technician in this field without departing from the scope of the invention.

We claim:

1. Device for spreading the dough for pizzas in two mutually perpendicular directions comprising:
    a carrying structure having a sloping working surface;
    a first pair of rollers to roll the dough, supports for said rollers anchored to said sloping surface of the carrying structure;
    a second pair of rollers to roll the dough which is positioned substantially at an angle to said first pair, supports for said second pair of rollers anchored to said sloping surface of the carrying structure;
    a metal sheet acting as a sliding surface for the dough and installed on said sloping surface in such a way that the lower rollers of said pairs of rollers protrude partially above said surface, whereby the protrusion of said lower rollers can be regulated with suitable positioning means that anchor said surface; and
    an oscillating supporting and guiding means fitted to said sliding surface in a zone between the two pairs of rollers and able to temporarily and movably support and guide the dough sliding down said surface only when said dough is engaged by said pair of rollers.

2. The device as in claim 1, wherein said pairs of rollers are positioned at right angles to each other.

3. The device as in claim 1 or claim 11, wherein said pairs of rollers are positioned at an angle to the lower side of the sloping working surface of the carrying structure.

4. The device as in claim 1, wherein the rollers of said pairs of rollers are kinematically connected to each other.

5. The device as in claim 1, including motor means, a pulley and belt and wherein the operation of said rollers by said motor means is carried out by means of said belt cooperating with said pulley keyed to one end of one of said rollers outside the support.

6. The device as in claim 1, including a counterweight lever and wherein said oscillating supporting and guiding means consist of said counterweight lever pivoting on the sliding surface in the zone between the pairs of rollers, said lever being equipped with a first curved arm supporting and guiding the dough and with a second arm which is provided with a counterweight and which regulates the supporting and guiding action exerted by said first arm.

7. The device as in claim 1, including a counterweight lever and wherein the oscillating supporting and guiding means consist of said counterweighed lever pivoting on the sliding surface in the zone between the pairs of rollers and is equipped with a shaped arm which supports and guides the dough and with a suitably located spring means that replaces the second arm.

8. The device as in claim 1, wherein at least one roller of at least one rolling pairs is specially shaped.

9. The device as in claim 1, including a path-corrector means, said metal sheet defining a slot therein, said path-corrector means consisting of a rotating disc protruding through said slit cut in said metal sheet and cooperating with the internal side of the dough with respect to its major axis, said rotating disc being kinematically connected to at least one of the pairs of the rollers.

* * * * *